United States Patent [19]

Gras

[11] Patent Number: 4,920,173

[45] Date of Patent: Apr. 24, 1990

[54] PUR POWDER PAINTS FOR MATT COATINGS

[75] Inventor: Rainer Gras, Bochum, Fed. Rep. of Germany

[73] Assignee: Huels Aktiengesellschaft, Marl, Fed. Rep. of Germany

[21] Appl. No.: 244,348

[22] Filed: Sep. 15, 1988

[30] Foreign Application Priority Data

Nov. 21, 1987 [DE] Fed. Rep. of Germany ....... 3739479

[51] Int. Cl.$^5$ .............................................. C08L 75/02
[52] U.S. Cl. .................................. 524/590; 524/507; 525/124; 525/128; 525/409; 525/415; 525/424; 525/440; 525/450; 525/452; 525/458
[58] Field of Search ............... 525/440, 124, 128, 452, 525/409, 415, 424, 450, 458; 524/507, 590

[56] References Cited

FOREIGN PATENT DOCUMENTS 3143060 5/1983 Fed. Rep. of Germany .

*Primary Examiner*—Patricia Short
*Attorney, Agent, or Firm*—Oblon, Spivak, McClelland, Maier & Neustadt

[57] ABSTRACT

PUR powder paints with matt surfaces that level well after baking are obtained when polymers containing hydroxyl groups with more than 2 OH groups in the molecule are reacted with blocked polyisocyanate-urea adducts of polyisocyanates and polyamines with an NCO content of 8 to 15 wt. % and a free NCO content of up to 4 wt. %.

23 Claims, No Drawings

PUR POWDER PAINTS FOR MATT COATINGS

BACKGROUND OF THE INVENTION

1. Field of the Invention:

The present invention relates to polyurethane resin (PUR) powder paints based on polymers containing hydroxyl groups and polyisocyanates containing urea groups as hardeners for matt coatings.

2. Discussion of the Background:

For many coatings, a high gloss is not desired. The reason for this is generally of a practical nature. Glossy surfaces require a higher degree of cleaning than matt surfaces; furthermore, it may be necessary for safety reasons to avoid strongly reflecting surfaces.

Matt surfaces can be produced by admixing smaller or larger amounts of fillers such as chalk, finely divided silicon dioxide, or barium sulfate with the powder paint, depending on the desired degree of gloss. Of course, these additives affect the mechanical film properties negatively. The resulting paint films are also frequently porous.

The addition of organic polymeric additives such as polypropylene wax or cellulose derivatives likewise leads to matting but in this case the matting effect is not always reproducible.

Additionally, matting can also be achieved by dry mixing of various powders, optionally of varying reactivity. The involved and tedious preparation as well as the lack of reproducibility of the desired gloss are considered to be drawbacks (for example, see DE-OS 21 47 653 and DE-OS 22 47 779).

The powder paint system for mat coatings described in Japanese Patent Application Disclosure 79/36339 consists of:

(a) 95 to 20% of a PUR system consisting of a polyester polyol with a softening point of 65° to 130° C. and a blocked polyisocyanate, and (b) 5 to 80% of an epoxyacrylic system consisting of an acrylate resin containing glycidyl ether groups that is cured with a dicarboxylic acid.

This powder paint system suffers from the same drawbacks as mentioned in the case of matting by mixing powders, and, furthermore, when using powders of varying reactivity, internal stresses of the different binder systems cured under different conditions lead to a reduction of paint film properties.

A process is described in DE-PS 23 24 696 for preparing coatings with matt surfaces, in which the salts of cyclic amidines with certain polycarboxylic acids is used to harden epoxy resins.

For powder paints that contain epoxy resins as binder components and are only used indoors, the previous procedures for matting by addition of fillers and/or by incompatibility of the binder components used and/or by dry mixing of various powders of optionally differing reactivity can be circumvented with the matting hardeners proposed in DE-PS 23 24 696.

However, the epoxy resin powder paints described are not suitable for preparing weather-resistant and lightfast coatings. For this application, binders based on saturated polyesters containing hydroxyl groups and/or acrylates and polyisocyanates are used, for example 3-isocyanatomethyl-3,5,5-trimethylcyclohexylisocyanate, also called isophoronediisocyanate (IPDI).

Such weather-resistant powder paints are described in DE-OS 32 32 463. In addition to epsilon caprolactam blocked isocyanate groups they also contain carboxyl groups in a certain ratio, which gives rise to the disadvantage that, in addition to polyesters containing hydroxyl groups, a third binder component, namely polyepoxides, must be used.

Finally, polyurethane powder paints for matt coatings that are based on three binder components are also described in DE-OS 33 28 129. In this case, pyromellitic dianhydride is used in addition to the polyester containing hydroxyl groups and the blocked polyisocyanate.

These procedures also suffer from the disadvantage of not providing a reproducible matting effect.

With these weather resistant polyurethane powder paints, known procedures have had to be used to make matt powders while accepting the substantial drawbacks, i.e.

(a) the drawbacks mentioned in matting with fillers, (b) the drawbacks mentioned when matting from incompatibility of the binder components used, (c) the mentioned drawbacks when matting by mixing different powders, (d) the mentioned drawbacks when matting by using three binder components.

Thus, there is a need for powder paints for matt coatings that do not suffer from the above-mentioned drawbacks.

There is a further need for a process to produce powder paints for matt coatings that do not suffer from the above-mentioned drawbacks.

SUMMARY OF THE INVENTION

It is an object of the present invention to produce powder paints that do not suffer from the disadvantages mentioned above.

It is a further object of the present invention to provide a novel process for producing heat-curable coatings based on polyurethane that are stable in storage and that provide a dull surface that levels well after baking.

These and other objects have been achieved by the surprising discovery that PUR powder paints with a matt surface are also obtained when using only two binder components when special reversibly blocked polyisocyanates with urea structure are used for the crosslinking of polymers containing hydroxyl groups.

Epsilon caprolactam-blocked IPDI adducts containing urea groups for preparing PUR powder paints have already been described and claimed in DE-OS 31 43 060. However, these are exclusively PUR powder paints whose paint films have glossy surfaces. This is completely understandable since, although the crosslinking agents disclosed in DE-OS 31 43 060 do contain urea groups, these IPDI-urea adducts are mixed to a great extent with blocked monomeric IPDI. The high concentration of the blocked monomeric IPDI is responsible for the high gloss, as demonstrated in the examples. The urea groups in turn are responsible for the improvement of the storage stability of sprayable powder.

The object of this invention, therefore, is PUR powder paints for matt coatings based on polymers containing hydroxyl groups and polyisocyanate adducts as well as conventional additives, which are characterized by the fact that the mixtures consist of:

(A) partially or completely blocked polyisocyanate-urea adducts from polyisocyanates and polyamines with an NCO content of 8 to 15 wt. %, preferably of 9 to 13 wt. %, a free NCO content of up to 4 wt. %, preferably up to 3 wt. %; and (B) polymers containing hydroxyl groups with more than two OH groups in the molecule.

DETAILED DESCRIPTION OF THE PREFERRED EMBODIMENTS

The preparation of the PUR powder paints with reduced gloss of the present invention is possible by controlling the vigorous reaction between primary and-/or secondary polyamines with polyisocyanates so that the formation of high-melting polyureas that negatively affect the leveling of paint surfaces is avoided.

This selective reaction of polyisocyanates and polyamines is possible by using a partially blocked polyisocyanate with a content of unblocked polyisocyanate of less than 6.5 wt. %, preferably less than 2.5 wt. %.

The preparation of these partially blocked polyisocyanates is the object of copending U.S. patent application Ser. No. 243,605, which is incorporated herein by reference, and is accomplished by adding 1 mole of a blocking agent to a large excess (5 to 20 moles) of a polyisocyanate at temperatures of from 50° to 130° C. and then reducing the excess polyisocyanate by thin film evaporation to less than 6.5 wt. %, preferably less than 2.5 wt. %.

The urea formation, which is not claimed here, occurs from the reaction of these partially blocked polyisocyanates with polyamines. The ratio of amino groups to free NCO groups is from 1:1 to 1:1.3, preferably from 1:1 to 1:1.2.

The hardeners to be used in the present invention can generally and preferable be prepared from the industrially readily available polyisocyanates, especially from isophorone diisocyanate (IPDI), 1,6-hexamethylene diisocyanate (HDI), 2-methyl-1,5-pentane diisocyanate (DI51), and 2,4- and 2,6-toluene diisocyanate and their isomeric mixtures. In addition to IPDI other cycloaliphatic diisocyanates are suitable. The polyisocyanate used for thin film evaporation should have a vacuum distillation temperature below the deblocking temperature of the blocking agent used.

The polyamine may be an aliphatic, cycloaliphatic, heterocyclic or aromatic diamine or polyamine.

Polyamines preferred for preparing the hardeners of the present invention are 1,12-dodecamethylenediamine, tetraethylenepentamine, pentaethylenehexamine, 3,3'-dimethyl-4,4'-diaminodicyclohexylmethane, 4,4'-diaminodiphenylmethane. Mixtures of isophoronediamine and aliphatic polyamines, especially 2,2,4(2,4,4)-trimethyl-1,6-hexamethylenediamine, can also be used.

Especially preferred diamines are isophoronediamine, 4,4'-diaminodicyclohexylmethane, and bis(1,4-aminomethyl)cyclohexane and their isomeric mixtures and mixtures with one another.

Preferred blocking agents are lactams and oximes, especially epsilon caprolactam and methyl ethyl ketoxime.

The hardeners of the present invention are prepared in the presence of suitable solvents such as toluene, cyclohexane, high-test gasoline (less than 1 vol. % aromatics), ethyl acetate or acetone.

The reaction generally occurs between room temperature and 80° C., preferably between room temperature and 70° C. The polyisocyanate is dissolved in the solvent and the polyamine is added slowly either in bulk or dissolved in the solvent so that the reaction temperature does not rise above 70° C. After completion of the reaction, as indicated by titrimetric NCO determination, the solvent is removed from the reaction product under vacuum. Melt extrusion in a degassing screw extruder is particularly suitable for removing the solvent.

A particularly suitable process for preparing the hardeners of the present invention has proved to be dissolving the partially blocked polyisocyanate in high-test gasoline with less than 1 vol. % aromatics or cyclohexane and adding the polyamine slowly at room temperature neat or dissolved in high-test gasoline or cyclohexane so that the reaction temperature does not rise above 70° C. In this case, the addition product precipitates and the solvent is easily removed after completion of the reaction.

The catalysts accelerating the isocyanate polyaddition and the leveling agents can beneficially be added directly to the polyisocyanate-urea adducts. Both are usually added separately to the powder paint as a polyester masterbatch. Catalysts that are used preferably are organic tin compounds such as tin(II) acetate, oleate, octanoate, laurate, dibutyltin dilaurate (DBTL), dibutyltin maleate, or dibutyltin diacetate. The catalysts are generally used in an amount between from 0.01 to 1.5 wt. %, preferably 0.1 to 0.5 wt. %, based on the total amount of reactants used.

The partially or totally blocked polyisocyanates with urea groups used in the present invention can be ground or pulverized and can be distributed homogeneously in this form into the reactants. In general, they have a total NCO content of from 8 to 15 wt. %, preferably from 9 to 13 wt. %, and a free NCO content of from 0 to 4 wt. %, preferably from 0 to 3 wt. %. The melting temperature ranges between 90° and 220° C., preferably between 120° and 185° C.

Suitable reactants are compounds that have functional groups that react with isocyanate groups during the curing process depending on the temperature and time, for example hydroxyl, carboxyl, mercapto, amino, urethane, and (thio)urea groups. Polymers, polycondensates, and polyaddition compounds can be used as polymers.

Preferred components are especially polyethers, polythioethers, polyacetals, polyesteramides, epoxy resins with hydroxyl groups in the molecule, aminoplasts and their modification products with polyfunctional alcohols, polyazomethines, polyurethanes, polysulfonamides, melamine derivatives, cellulose esters and ethers, partially saponified homopolymers and copolymers of vinyl esters. Particularly preferred are polyesters and acrylate resins.

The polyesters containing hydroxyl groups used in the present invention have an OH functionality of 2.5 to 5, preferably from 3 to 4.2, an average molecular weight of from 1,800 to 5,000, preferably from 2,300 to 4,500, an OH number of 25 to 120 mg KOH/g, preferably from 30 to 90 mg KOH/g, a viscosity less than 80,000 mPa·s, preferably less than 50,000 mPa·s, and with special preference less than 40,000 mPa·s at 160° C., and a melting point of from 70° C. to 120° C., preferably from 75° C. to 100° C.

Particularly preferred polyesters containing hydroxyl groups used in the present invention have an OH functionality of 3.5 to 3.9, an OH number of 35 to 85 mg KOH/g, an average molecular weight of 2,800 to 3,500, a viscosity less than 40,000 mPa·s, and a melting point of from 75° to 100° C.

Preferred carboxylic acids for making the polyesters of the present invention are aliphatic, cycloaliphatic, aromatic, or heterocyclic carboxylic acids and are optionally substituted with halogen atoms and/or unsaturated. Specific examples include:

Succinic, adipic, suberic, azelaic, sebacic, phthalic, terephthalic, isophthalic, trimellitic, pyromellitic, tetrahydrophthalic, hexahydrophthalic, hexahydroterephthalic, di- and tetrachlorophthalic, endomethylenetetrahydrophthalic, glutaric, maleic, and fumaric acid, or if available, their anhydrides, dimethyl terephthalate, bix(glycol) terephthalate, or cyclic monocarboxylic acids such as benzoic acid, p-t-butylbenzoic, or hexahydrobenzoic acid.

Examples of suitable polyfunctinal alcohols are ethylene glycol, 1,2- and 1,3-propylene glycol, 1,4-and 2,3-butylene glycol, di(beta-hydroxyethyl) butanediol, 1,6-hexanediol, 1,8-octanediol, neopentyl glycol, cyclohexanediol, bis(1,4-hydroxymethyl)cyclohexane, 2,2-bis4-hydroxycyclohexyl)propane 2,2-bis[4-(beta-hydroxyethoxy)phenyl]propane, 2-methyl-1,3-propanediol, 3-methyl-1,5-pentanediol, 2,2,4(2,4,4)-trimethyl-1,6-hexanediol, gylcerin, trimethylolpropane, trimethylolethane, 1,2,6-hexanetriol, 1,2,4-butanetriol, tris(beta-hydroxyethyl)isocyanurate, pentaerythritol, mannitol, and sorbitol, as well as diethylene glycol, triethylene glycol, tetraethylene glycol, dipropylene glycol, polypropylene glycols, polybutylene glycols, xylylene glycol, and neopentyl glycol hydroxypivalate.

Mono- and polyesters from lactones, for example epsilon caprolactone, or from hydroxycarboxylic acids, for example hydroxypivalic acid, omega-hydroxydecanoic acid, omega-hydroxycaproic acid, thioglycolic acid can also be used. Polyesters that are available by known procedures from the aforementioned polycarboxylic acids or their derivatives and polyphenols such as hydroquinone, Bisphenol A, 4,4'-dihydroxybiphenyl, or bis(4-hydroxyphenyl)sulfone and polyesters of carbonic acid that are available by conventional condensation reactions of hydroquinone, diphenylpropane, p-xylylene glycol, ethylene glycol, butanediol, or 1,6-hexanediol, and other polyols with, for example, phosgene or diethyl or diphenyl carbonate, or from cyclic carbonates such as glycol carbonate or vinylidene carbonate are also suitable. Polyesters of silicic acid, polyesters of phosphoric acid, for example from methyl, ethyl, beta-chloroethyl, phenyl, or styryl phosphoric acid chloride or esters and polyalcohols or polyphenols of the aforementioned kind, and polyesters of boric acid may be used. Polysiloxanes such as the products available by hydrolysis of dialkyldichlorosilanes with water followed by treatment with polyalcohols and the products available by addition of polysiloxane dihydrides to olefins, such as alkyl alcohol or acrylic acid are also suitable.

Examples of preferred polyesters are the reaction products of polycarboxylic acids and glycidyl compounds such as those described, for example, in DE-OS 24 10 513.

Examples of glycidyl compounds that can be used are esters of 2,3-epoxy-1-propanol with monobasic acids that have 4 to 18 carbon atoms, such as glycidyl palmitate, glycidyl laurate, and glycidyl stearate, alkylene oxides with 4 to 18 carbon atoms such as butylene oxide, and glycidyl ethers such as octyl glycidyl ether.

Dicarboxylic acids that can also be used in this process are all of the polycarboxylic acids listed under II below. Monocarboxylic acids such as those listed under III, for example, can likewise be used.

Other preferred components are monomeric esters such as bis(hydroxyalkyl)esters of dicarboxylic acids, monocarboxylic acid esters from polyols and oligoesters that are more than difunctional, which can be prepared by condensation reactions from raw materials common in paint chemistry.

Examples of preferred polyols include:

I. alcohols with 2 to 24, preferably 2 to 10 carbon atoms and 2 to 6 OH groups bonded to nonaromatic carbon atoms, for example ethylene glycol, propylene glycol, diethylene glycol, dipropylene glycol, butanediols, neopentyl glycol, hexanediols, hexanetriols, perhydrobisphenol, dimethylolcyclohexane, glycerin, trimethylolethane, trimethylolpropane, pentaerythritol, dipentaerythritol, mannitol.

II. Examples of preferred polycarboxylic acids include: di- and polycarboxylic acids with 4 to 36 carbon atoms and 2 to 4 carboxyl groups and their esterifiable derivatives such as anhydrides and esters, for example phthalic acid (anhydride), isophthalic acid, terephthalic acid, alkyltetrahydrophthalic acid; endomethylenetetrahydrophthalic acid anhydride, adipic acid, succinic acid, maleic acid, fumaric acid, dimeric fatty acids, trimellitic acid, pyromellitic acid, azelaic acid.

III. Preferred monocarboxylic acids are monocarboxylic acids with 6 to 24 carbon atoms, for example caprylic acid, 2-ethylhexanoic acid, benzoic acid, p-t-butylbenzoic acid, hexahydrobenzoic acid, monocarboxylic acid mixtures of natural oils and fats such as coconut oil fatty acid, soybean oil fatty acid, castor oil fatty acid, hydrogenated and isomerized fatty acids such as "Konjuvandol" fatty acid and their mixtures. The fatty acids or their glycerides can be used and can be reacted with transesterification and/or dehydration.

IV. Preferred monostructural alcohols are monofunctional alcohols with 1 to 18 carbon atoms such as methanol, ethanol, isopropanol, cyclohexanol, benzyl alcohol, isodecanol, nonanol, octanol, and oleyl alcohol.

The polyesters can be obtained in a known way by condensation in an inert gas atmosphere at temperatures of from 100° to 260° C., preferably from 130° to 220° C., in the melt, or by an azeotropic procedure as described, for example, in *Methoden der Organischen Chemie* (Houben-Weyl), Vol. 14/2, 1–5, 21–23, 40–44, Georg Thieme Verlag, Stuttgart, 1963, or in C. R. Martens, *Alkyd Resins,* 51–59, Reinhold Plastics Appl. Series, Reinhold Publishing Comp., New York, 1961.

Preferred acrylate resins that can be used as the OH component are homo- or copolymers, for which the following monomers can be selected as starting materials: esters of acyrlic acid and methacrylic acid with divalent saturated aliphatic alcohols with 2 to 4 carbon atoms, such as 2-hydroxyethyl acrylate, 2-hydroxypropyl acrylate, 4-hydroxybutyl acrylate, and the corresponding methacrylic esters; acrylic acid and methacrylic acid alkyl esters with 1 to 18, preferably 1 to 8 carbon atoms in the alcohol component, such as methyl acrylate, ethyl acrylate, propyl acrylate, isopropyl acrylate, n-butyl acrylate, t-butyl acrylate, 2-ethylhexyl acrylate, stearyl acrylate, and the corresponding methacrylic esters; cyclohexyl acrylate and methacrylate; acrylonitrile and methacrylonitrile; acrylamide and methacrylamide; N-methoxymethyl(meth)acrylamide.

Particularly preferred acrylic resins are copolymers of a. 0 to 50 wt. % of a monoester of acrylic or methacrylic acid with a divalent or polyvalent alcohol such as 1,4-butanediol monoacrylate, hydroxypropyl (meth)acrylate; also vinyl glycol, vinylthioethanol, allyl alcohol, 1,4-butanediol monovinyl ether;

b. 5 to 95 wt. % of an ester of acrylic acid or methacrylic acid with a monofunctional alcohol that contain 1 to 12 carbon atoms, such as methyl methacrylate, ethyl acrylate, n-butyl acrylate, or 2-ethylhexyl acrylate;

c. 0 to 50 wt. % of an aromatic vinyl compound such as styrene, methylstyrene, or vinyltoluene; and d. 0 to 20 wt. % of other monomers with functional groups such as acrylic acid, methacrylic acid, crotonic acid, itaconic acid, maleic acid, fumaric acid, maleic anhydride, maleic acid half-esters, acrylamide, methacrylamide, acrylonitrile, or N-methylol(meth)acrylamide, and glycidyl (meth)acrylate, with the amount of component a and/or d being at least 5 wt. %.

The acrylate resins can also be prepared by the conventional methods, for example solution, suspension, emulsion, or precipitation polymerization; however, bulk polymerization is preferred, which in turn can be initiated by UV light.

Other polymerization initiators that are used are conventional peroxides or azo compounds such as dibenzoyl peroxide, t-butyl perbenzoate, or azobisisobutyronitrile. The molecular weight can be controlled with sulfur compounds such as t-dodecyl mercaptan, for example.

Preferred polyethers can be prepared, for example, by polyaddition of epoxides such as ethylene oxide, propylene oxide, butylene oxide, trimethylene oxide, 3,3-bis(chloromethyl)oxacyclobutane, tetrahydrofuran, styrene oxide, the bis(2,5)-epoxypropyl ether of diphenylolpropane, or epichlorohydrin with themselves, for example in the presence of $BF_3$, or by addition of these epoxides, optionally mixed or in succession, to starting materials with reactive hydrogen atoms such as alcohols or amines, for example water, ethylene glycol, 1,3- or 1,2-propylene glycol, pentamethylene glycol, hexanediol, decamethylene glycol, trimethylolpropane, 4,4'-dihydroxydiphenylpropane, aniline, ammonia, ethanolamine, ethylenediamine, di(beta-hydroxypropyl)-methylamine, di(beta-hydroxyethyl)aniline, hydrazine, and hydroxyalkylated phenols such as O,)-di(beta-hydroxyethyl)resorcinol.

Polyurethanes and/or polyureas containing hydroxyl groups can also be used.

Mixtures of several substances can naturally be used as polyhydroxyl compounds.

The powder paints of the present invention can also contain pigments of fillers in an amount up to 45 wt. % based on the total weight of said paint.

Degrees of gloss of up to 10, measured by the Gardner method (GG, 60° angle) can usually be achieved with the PUR powder paints of the present invention. The degree of gloss can be adjusted within broad ranges in various ways. The isocyanate component is mixed and homogenized in the melt with the polymer containing hydroxyl groups and optionally with the catalysts described in connection with the preparation of the polyisocyanate-urea adducts and other additives such as pigments, fillers, and leveling agents, for example, silicone oil and liquid acrylate resins. This can be done in suitable units such as heated kneaders, but is preferably accomplished by extrusion, during which upper temperature limits of from 130° to 140° C. should not be exceeded. The extruded composition, after cooling to room temperature and after suitable pulverization, is ground into a sprayable powder. The sprayable powder can be applied to suitable substrates by known procedures, for example by electrostatic powder spraying, whirl sintering, electrostatic whirl sintering. After the application of the powder, the coated parts are heated at a temperature of from 160° to 220° C. for 60 to 10 minutes, preferably at 180° to 210° C. for 30to 10 minutes, for curing.

Other features of the present invention will become apparent in the course of the following descriptions of exemplary embodiments which are given for illustration of the invention and are not intended to be limiting thereof.

EXAMPLES

A. Preparation of the partially blocked polyisocyanates

General instructions for preparation

One mole ob blocking agent is added in portions with stirring at 60° to 80° C. to from 5 to 20 moles of polyisocyanate. After completion of the addition of the blocking agent, the reaction mixture is heated for 1 hour longer at 100° C. and the unreacted polyisocyanate is then removed by thin film evaporation between 90° and 140° C. at 0.133 mbar. The chemical and physical characteristics of the reaction product (residue) were determined are summarized in the table below:

| | Starting materials | | Partially blocked polyisocyanates | | | | | | | |
|---|---|---|---|---|---|---|---|---|---|---|
| | | | NCO content in wt. % | | Free Polyisocyanate | Viscosity in mPa.s at °C. | | | | |
| Examples A | Polyisocyanate | Blocking agent | free | total | wt. % | 25° C. | 30° C. | 40° C. | 50° C. | 70° C. |
| 1 | IPDI | Caprolactam | 11.6 | 24.7 | 1.1 | 1250000 | 410000 | 63500 | 13700 | 1250 |
| 2 | IPDI | Caprolactam | 11.5 | 24.5 | 2.2 | 1145000 | 397000 | 61250 | 12530 | 1070 |
| 3 | IPDI | Caprolactam | 11.6 | 24.4 | 3.5 | 1120000 | 360000 | 59500 | 11500 | 980 |
| 4 | IPDI | Caprolactam | 11.8 | 24.5 | 4.6 | 660000 | 194000 | 34000 | 8550 | 680 |
| 5 | IPDI | Caprolactam | 11.85 | 24.6 | 6.4 | 451000 | 101000 | 22000 | 4500 | 450 |
| 6 | HDI | Caprolactam | 15.3 | 29.4 | 0.5 | 100 | 80 | 50 | 30 | <30 |
| 7 | DI51 | Caprolactam | 14.8 | 29.3 | 0.7 | 160 | 120 | 60 | 45 | <30 |

The ratio of polymer containing hydroxyl groups to the isocyanate component is usually chosen so that there are from 0.6 to 1.2 NCO groups for each OH group. It is preferred that the ratio of hydroxyl groups to NCO groups be from about 1.0:0.8 to about 1.0:1.1, and it is particularly preferred that the number of NCO groups equals the number of OH groups.

B. Preparation of the blocked polyisocyanate-urea adducts

General instructions for preparation

To a 50 to 70% toluene solution of a partially blocked polyisocyanate are added the equivalent amounts, based on the free NCO content, of a 50 to 70% toluene solution of a diamine or polyamine or mixtures thereof, at 55° to 65° C. with intensive stirring, in such a way that the reaction temperature does not rise above 70° C. After completing the addition of the amine, the reaction mixture is heated for 30 to 45 minutes longer. During this time, the temperature is slowly raised to 100° to 120° C. The toluene is then removed from the reaction product under vacuum at 0.133 mbar. The chemical and physical characteristics of the reaction products are summarized int he table below:

(a) IPDI-urea adducts according to A2 and amine component
(b) IPDI-urea adducts according to A1 and amine component
(c) HDI-urea adducts according to A6 and amine component
(d) DI51-urea adducts according to A7 and amine component
(e) IPDI-urea adducts according to A3, A4, A5, and amine component
(f) IPDI-urea adducts according to A2 with a $NCO/NH_2$ ratio of from 1.05 to 1.3:1 and amine component
(g) IPDI-urea adducts according to A2 and amine component prepared in high-test gasoline or cyclohexane

| Example Be | IPDI Add. accg. to | NCO content in wt. % latent | NCO content in wt. % free | Melting range °C. | Glass transition temperature (DTA) °C. |
|---|---|---|---|---|---|
| 1 | A 3 | 10.3 | 0.3 | 148–150 | 38–72 |
| 2 | A 4 | 10.2 | 0.1 | 155–161 | 37–78 |
| 3 | A 5 | 10.25 | 0.2 | 155–157 | 40–95 |

Example Bf

In accordance with the general instructions for preparation B, partially blocked IPDI in accordance with A2 was not reacted in an equivalent ratio with 4,4'-diaminodicyclohexylmethane, but with an NCO/amine ratio of X:1. The chemical and physical characteristics are summarized below:

| Example Bf | X | NCO content in wt. % total | NCO content in wt. % free | Melting range °C. | Glass transition temperature (DTA) °C. |
|---|---|---|---|---|---|
| 1 | 1.05 | 9.9 | 0.4 | 145–148 | 35–58 |
| 2 | 1.1 | 10.7 | 0.8 | 140–142 | 33–59 |
| 3 | 1.2 | 11.5 | 1.4 | 138–140 | 35–58 |
| 4 | 1.3 | 12.0 | 1.95 | 131–136 | 33–55 |

| | Amine component | NCO content (wt. %) latent | NCO content (wt. %) free | Melting range °C. | Glass transition temperature (DTA) °C. |
|---|---|---|---|---|---|
| Example Ba | | | | | |
| 1 | 1,12-Dodecamethylenediamine | 9.6 | 0.3 | 93–96 | 32–56 |
| 2 | 3,3'-Dimethyl-4,4'-diaminodicyclohexylmethane | 9.3 | 0 | 149–155 | 37–85 |
| 3 | 4,4'Diaminodicyclohexylmethane (solid) | 9.9 | 0.25 | 148–150 | 39–58 |
| 4 | 4,4'-Diaminodicyclohexylmethane (liquid) | 10.0 | 0.3 | 146–149 | 40–57 |
| 5 | 4,4-40 -Diaminodiphenylmethane | 10.0 | 0.3 | 178–182 | 58–74 |
| 6 | Isophoronediamine (IPD) | 10.5 | 0.1 | 160–165 | 60–87 |
| 7 | 70 parts by wt. IPD 30 parts by wet. TMD* | 9.9 | 0 | 138–148 | 38–61 |
| 8 | Pentamethylenehexamine | 12.1 | 0.4 | 113–115 | 36–70 |
| 9 | Bis(1,4-aminomethyl)-cyclohexane | 10.9 | 0.5 | 133–140 | 50–80 |
| Example Bb | | | | | |
| 1 | 4,4'-Diaminodicyclohexylmethane (liquid) | 10.2 | 0.1 | 144–147 | 41–59 |
| 2 | Bis(1,4-aminomethyl)cyclohexane | 10.8 | 0.3 | 136–141 | 53–75 |
| Example Bc | | | | | |
| 1 | 4,4'-Diaminodicyclohexylmethane (liquid) | 10.7 | 0 | 124–126 | 26–52 |
| Example Bd | | | | | |
| 1 | 4,4'-Diaminodicyclohexylmethane (liquid) | 10.6 | 0.1 | 105–111 | 24–52 |
| 2 | Bis(1,4-aminomethyl)-cyclohexane | 11.3 | 0 | 100–104 | 29–60 |

*TMD = 2,2,4(2,4,4)-trimethyl-1,6-hexamethylenediamine

Example Be

In accordance with the general instructions for preparation B, the partially blocked IPDI adducts from A3, A4, and A5 were reacted with 4,4'-diaminodicyclohexylmethane. The chemical and physical characteristics are shown below:

Example Bg

To 730 parts by wt. of partially blocked IPDI according to Example A2, dissolved in 500 to 550 parts by wt. of high-test gasoline (contains 3 vol. % aromatics) or cyclohexane is slowly added the calculated amount of amine component, based on the free NCO content, at room temperature with vigorous stirring in such a way that the reaction temperature does not rise above 70° C.

The polyisocyanate-urea adduct precipitates during the addition of the diamine. After the addition of the diamine is complete, the stirring is continued for 30 to 45 minutes longer and the solvent is then removed after titrimetric determination of NCO. The following table shows the chemical and physical characteristics of the products:

reaction and a gentle stream of $N_2$ is fed through the reaction mixture.

The table below shows polyester compositions and the corresponding physical and chemical characteristics.

| | | Polyester | | | | | | | | |
|---|---|---|---|---|---|---|---|---|---|---|
| | Starting materials | | | | | | Chemical and physical characteristics | | | |
| Example | TA Moles | DMT Moles | HD Moles | NPG Moles | DMC Moles | TMP Moles | OH No. mg KOH/g | Acid No. mg KOH/g | Melting pt. °C. | DTA* °C. | Viscosity at 160° C. in mPa.s |
| 1 | 10 | 10 | 6.25 | 10.5 | 2 | 2.9 | 55–60 | 3–4 | 75 | 50 | 25,000 |
| 2 | 10 | 10 | 5.75 | 10 | 3 | 2.9 | 58–63 | 3–4 | 79 | 50 | 28,000 |
| 3 | 11 | 11 | 9.75 | 11 | — | 2.9 | 50–55 | 3–4 | 76 | 50 | 22,000 |
| 4 | 6 | 9 | 3 | 7.5 | 3.25 | 2.9 | 80–81 | 2–4 | 80 | 50 | 12,000 |
| 5 | 12 | 12 | 6.75 | 11.5 | 5 | 3 | 58–63 | 3–5 | 80 | 50 | 19,000 |
| 6 | 8 | 7 | 5 | 10 | 2 | 1 | 35–40 | 3–4 | 80 | 50 | 40,000 |
| 7 | 8 | 9 | 5 | 8.5 | 4 | 1 | 38–43 | 3–4 | 70 | 48 | 19,000 |
| 8 | 9 | 9 | 3 | 13 | 3 | 1 | 50–56 | 3–4 | 70 | 50 | 10,000 |
| 9 | ALFTALAT AN 739 Polyester from Hoechst AG | | | | | | 55–60 | 2–3 | 70 | 50 | 28,000 |
| 10 | CRYLCOAT 280 M Polyester from UCB-Belgium | | | | | | 49–50 | 4–5 | 85 | 55 | 43,000 |
| 11 | CERCLAN U 502 Polyester from Bayer AG | | | | | | 45–55 | <10 | 76 | 50 | 23,000 |

*Glass transition temperature

| NCO/Amine ratio = 1:1 | | | | | |
|---|---|---|---|---|---|
| Example Bg | Amine component | NCO content in wt. % total | free | Melting range °C. | Glass transition temperature (DTA) °C. |
| 1 | 4,4'-Diaminodicyclohexylmethane (liquid) | 9.5 | 0.4 | 146–149 | 36–63 |
| 2 | Bis-(1.4-aminomethyl)cyclohexane | 10.2 | 0.4 | 134–136 | 45–95 |
| 3 | Isophoronediamine | 10.0 | 0.4 | 154–159 | 56–84 |
| 4 | Pentaethylenehexamine | 11.3 | 0 | 123–127 | 37–65 |
| NCO/Amine ratio 1.1; 1.2; 1.3:1 | | | | | |
| 5 | 4,4'-Diaminodicyclohexylmethane | 10.9 | 0.8 | 137–141 | 37–60 |
| 6 | 4,4'-Diaminodicyclohexylmethane | 11.2 | 1.5 | 140–141 | 33–58 |
| 7 | 4,4'-Diaminodicyclohexylmethane | 12.1 | 1.9 | 133–135 | 32–56 |

C. Polyol component

General instructions for preparation

The starting materials—terephthalic acid (TA), dimethyl terephthalate (DMT), 1,6-hexanediol (HD), neopentyl glycol (NPG), 1,4-dimethylolcyclohexane (DMC), and trimethylolpropane (TMP)—are placed in a reactor and heated with an oil bath. After the substances have mostly melted, 0.05 wt. % of di-n-butyltin oxide is added at a temperature of 160° C. as catalyst. Methanol first splits off at a temperature of appox. 170° C. The temperature is increased to from 220° to 230° C. over a period of from 6 to 8 h, and the reaction is complete within another 12 to 15 h. The polyester is cooled to 200° C., and volatile fractions are largely removed within 30 to 45 min by applying a vacuum (1.33 mbar). The residual product is stirred during the entire time or

D. Polyurethane powder paints

General instructions for preparation

The ground products, crosslinking agent, polyester, leveling agent, and optional catalyst masterbatch, are mixed intimately in an edge mill with the white pigment and fillers, when applicable, and are then homogenized in an extruder at from 90° to 130° C. After cooling, the extrudate is broken up and ground to a particle size <100 μm with a pinned disk mill. The powder thus produced is applied to a degreased, optionally pretreated iron plate with an electrostatic powder spray system at 60 kV, and is baked at temperatures between 160° to 200° C. in a circulating air drying oven.

Leveling agent masterbatch 10 wt. % of the leveling agent, a commercial copolymer of butyl acrylate and 2-ethylhexyl acrylate, is homogenized in the corresponding polyester in the melt and is pulverized after solidification.

Catalyst masterbatch 5 wt. % of catalyst, in this case di-n-butyltin dilaurate, is homogenized in the corresponding polyester in the melt and is pulverized after solidification. The abbreviations in the following tables mean:
FT=Film thickness in μm
HB=Buchholz Hardness (DIN 53 153)
ET=Erichsen cupping in mm (DIN 53 156)
GS=Grid test (DIN 53 151)
GG 60° ☆ =Gardner gloss measurement (ASTM-D 523)
Imp. rev.=Impact reverse in g·m

EXAMPLE 1

Pigmented paint

The powder paint with the following formula was prepared by the procedure described, applied, and baked between 160° and 200 ° C.
358.4 parts by wt. polyester from Example C 1
191.6 parts by wt. crosslinking agent of Ba 1
400.0 parts by wt. white pigment (TiO$_2$)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60°≮ |
| 8'/200° C. | 60-80 | 111 | >10 | 0 | >944.6 | 56 |
| 10'/200° C. | 60-80 | 111 | >10 | 0 | >944.6 | 54 |
| 15'/200° C. | 60-80 | 111 | >10 | 0 | >944.6 | 55 |
| 15'/180° C. | 70-80 | 111 | >10 | 0 | >944.6 | 55 |
| 20'/180° C. | 80-90 | 111 | >10 | 0 | >944.6 | 55 |
| 25'/180° C. | 70 | 111 | >10 | 0 | >944.6 | 56 |
| 20'/170° C. | 60-70 | 111 | >10 | 0 | 345.6 | 57 |
| 25'/170° C. | 50-60 | 111 | 9.7->10 | 0 | 576 | 56 |
| 30'/160° C. | 50-60 | 111 | 7.2-9.1 | 0 | 230.4 | 58 |
| 35'/160° C. | 50-60 | 111 | >10 | 0 | 460.8 | 56 |

EXAMPLE 2

Pigmented paint

The powder paint with the following formula was prepared by the procedure described, applied, and baked between 160° and 200° C.
358.4 parts by wt. polyester from Example C 1
191.6 parts by wt. crosslinking agent of Ba 1
300.0 parts by wt. white pigment (TiO$_2$)
50.0 parts by wt. leveling agent—masterbatch
100.0 parts by wt. DURCAL 5 ® (chalk from the Omya Company).

| Baking conditions Time/temp. | Mechanical characteristics | | | | | |
|---|---|---|---|---|---|---|
| | FT | HB | ET | GS | Imp. rev. | GG 60°≮ |
| 8'/200° C. | 50-70 | 111 | 9.0-9.6 | 0 | 806.4 | 47 |
| 10'/200° C. | 50-80 | 100 | 9.7-10 | 0 | 806.4 | 48 |
| 15'/200° C. | 60-70 | 111 | >10 | 0 | >944.6 | 47 |
| 15'/180° C. | 70-80 | 100 | 9.4-9.6 | 0 | 691.2 | 49 |
| 20'/180° C. | 70-85 | 100 | 9.0-9.3 | 0 | 806.4 | 56 |
| 25'/180° C. | 60-75 | 111 | 10 | 0 | >944.6 | 51 |
| 20'/170° C. | 60-70 | 111 | 10 | 0 | 345.6 | 51 |
| 25'/170° C. | 60-70 | 100 | 9.5-9.8 | 0 | 460.8 | 49 |
| 30'/160° C. | 50-60 | 111 | 7.0-8.1 | 0 | 115.2 | 52 |
| 35'/160° C. | 50-60 | 111 | 9.4-9.5 | 0 | 230.4 | 53 |

EXAMPLE 3

Pigmented paint

The powder paint with the following formula was prepared by the procedure described, applied, and baked between 190° and 200° C.
331.6 parts by wt. polyester from Example C 1
188.4 parts by wt. crosslinking agent of Ba 1
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60°≮ |
| 15'/200° C. | 60 | 100 | 9.3-9.8 | 0 | >944.6 | 35 |
| 20'/200° C. | 60-70 | 100 | 9.0-9.1 | 0 | >944.6 | 34 |
| 25'/200° C. | 60-80 | 100 | 9.1-9.4 | 0 | >944.6 | 34 |
| 20'/190° C. | 60-70 | 100 | 7.0-8.0 | 0 | >944.6 | 37 |
| 25'/190° C. | 60 | 100 | 7.5-8.3 | 0 | >944.6 | 35 |
| 30'/190° C. | 60-70 | 100 | 8.5-9.0 | 0 | >944.6 | 36 |

EXAMPLE 4

Pigmented paint

The powder paint with the following formula was prepared by the procedure described, applied, and baked between 190° and 200° C. p0 361.1 parts by wt. polyester from Example C 1
188.9 parts by wt. crosslinking agent of Ba 2
400.0 parts by wt. white pigment (TiO$_2$)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60°≮ |
| 15'/200° C. | 60 | 111 | 7.1-7.9 | 0 | 230.4 | 32 |
| 20'/200° C. | 70-80 | 125 | 6.6 | 0 | 576 | 34 |
| 25'/200° C. | 60-70 | 125 | 7.4-7.5 | 0 | 460.8 | 34 |
| 20'/190° C. | 60 | 111 | 4.0-4.5 | 0 | 115.2 | 36 |
| 25'/190° C. | 60-70 | 125 | 5.1-5.7 | 0 | 115.2 | 36 |
| 30'/190° C. | 60-70 | 111 | 5.8-6.0 | 0 | 230.4 | 37 |

EXAMPLE 5

Pigmented paint

The powder paint with the following formula was prepared by the procedure described, applied, and baked between 190° and 200° C.
372.8 parts by wt. polyester from Example C 1
177.2 parts by wt. crosslinking agent of Ba 3
400.0 parts by wt. white pigment (TiO$_2$)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60°≮ |
| 15'/200° C. | 50-60 | 125 | 5.4-6.5 | 0 | 115.2 | 23 |
| 20'/200° C. | 60 | 125 | 7.4-7.5 | 0 | 230.4 | 25 |
| 25'/200° C. | 50 | 125 | 7.7 | 0 | 460.8 | 24 |
| 20'/190° C. | 50-60 | 125 | 4.0-4.3 | 0 | 115.2 | 26 |
| 25'/190° C. | 50-65 | 125 | 5.2-5.6 | 0 | 115.2 | 27 |
| 30'/190° C. | 60-70 | 125 | 5.4-5.7 | 0 | 230.4 | 25 |

EXAMPLE 6

Pigmented paint

The powder paint with the following formula was prepared by the procedure described, applied, and baked between 190° and 200° C.
343.2 parts by wt. polyester from Example C 1
176.8 parts by wt. crosslinking agent of Ba 3
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60°≮ |
| 15'/200° C. | 50-60 | 111 | 5.3-5.7 | 0 | 115.2 | 20 |
| 20'/200° C. | 60-70 | 111 | 5.5-5.9 | 0 | 115.2 | 19 |
| 25'/200° C. | 60-70 | 125 | 6.0-6.5 | 0 | 345.6 | 20 |
| 20'/190° C. | 50-70 | 111 | 3.8-4.1 | 0 | 115.2 | 23 |
| 25'/190° C. | 50-60 | 111 | 4.4-4.7 | 0 | 230.4 | 25 |
| 30'/190° C. | 60-70 | 111 | 4.5-5.0 | 0 | 230.4 | 25 |

EXAMPLE 7

Pigmented paint

The powder paint with the following formula was prepared by the procedure described, applied, and baked between 190° and 200° C.
366.4 parts by wt. polyester from Example C 9
183.6 parts by wt. crosslinking agent of Ba 3
400.0 parts by wt. white pigment ($TiO_2$)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60°< |
| 15'/200° C. | 40–50 | 125 | 4.4–5.7 | 0 | 115.2 | 41 |
| 20'/200° C. | 40–55 | 125 | 4.9–5.6 | 0 | 115.2 | 41 |
| 25'/200° C. | 40–50 | 125 | 5.6–6.5 | 0 | 345.6 | 42 |
| 20'/190° C. | 50 | 125 | 3.8–4.5 | 0 | 115.2 | 44 |
| 25'/190° C. | 45–55 | 125 | 4.5–4.9 | 0 | 115.2 | 46 |
| 30'/190° C. | 40–50 | 125 | 4.6–5.1 | 0 | 230.4 | 46 |

EXAMPLE 8

Pigmented paint

The powder paint with the following formula was prepared by the procedure described, applied, and baked between 190° and 200° C.
638.4 parts by wt. polyester from Example C 1
311.6 parts by wt. crosslinking agent of Ba 4
50.0 parts by wt. leveling agent—masterbatch.

| Baking conditions Time/temp. | Mechanical characteristics | | | | |
|---|---|---|---|---|---|
| | FT | ET | GS | Imp. rev. | GG 60° < |
| 15'/200° C. | 50–60 | 8.2–8.9 | 0 | >944.6 | Dull |
| 20'/200° C. | 40–50 | >10 | 0 | >944.6 | sur- |
| 25'/200° C. | 50–60 | >10 | 0 | >944.6 | face |
| 20'/190° C. | 50–60 | 7.5–8.3 | 0 | 691 | Dull |
| 25'/190° C. | 40–60 | 8.6–9.0 | 0 | 806.4 | sur- |
| 30'/190° C. | 50–60 | 9.2–9.9 | 0 | >944.6 | Dull face |

EXAMPLE 9

Pigmented paint

The powder paint with the following formula was prepared by the procedure described, applied, and baked between 190° and 200° C.
374.0 parts by wt. polyester from Example C 1
176.0 parts by wt. crosslinking agent of Ba 4
400.0 parts by wt. white pigment ($TiO_2$)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60° < |
| 15'/200° C. | 60–70 | 100 | 6.5–6.7 | 0 | 576 | 25 |
| 20'/200° C. | 50–65 | 100 | 7.1–7.3 | 0 | 806.4 | 27 |
| 25'/200° C. | 60–70 | 100 | 6.9–7.5 | 0 | 691.2 | 26 |
| 20'/190° C. | 60 | 100 | 3.5–4.6 | 0 | 345.6 | 27 |
| 25'/190° C. | 55–65 | 111 | 4.7–4.9 | 0 | 230.4 | 27 |
| 30'/190° C. | 60–70 | 100 | 5.5–5.9 | 0 | 345.6 | 28 |

EXAMPLE 10

Pigmented paint

The powder paint with the following formula was prepared by the procedure described, applied, and baked between 190° and 200° C.
343.3 parts by wt. polyester from Example C 1
176.7 parts by wt. crosslinking agent of Ba 4*
300.0 parts by wt. white pigment ($TiO_2$)
50.0 parts by wt. leveling agent—masterbatch
30.0 parts by wt. catalyst—masterbatch
100.0 parts by wt. DURCAL 5.

* The paint characteristics are identical within the limits of error when using the crosslinking agent Bb 1.

| Baking conditions Time/temp. | Mechanical characteristics | | | | | |
|---|---|---|---|---|---|---|
| | FT | HB | ET | GS | Imp. rev. | GG 60° < |
| 15'/200° C. | 50–60 | 100 | 7.0–7.2 | 0 | 806.4 | 19 |
| 20'/200° C. | 50–60 | 111 | 6.8–7.0 | 0 | 806.4 | 20 |
| 25'/200° C. | 50–60 | 100 | 6.9–7.0 | 0 | 806.4 | 22 |
| 20'/190° C. | 60–70 | 100 | 3.6–4.6 | 0 | 115.2 | 25 |
| 25'/190° C. | 60–75 | 100 | 4.2–4.7 | 0 | 230.4 | 26 |
| 30'/190° C. | 50–60 | 100 | 5.5–6.3 | 0 | 230.4 | 24 |

EXAMPLE 11

Pigmented paint

The powder paint with the following formula was prepared by the procedure described, applied, and baked between 190° and 200° C.
340.7 parts by wt. polyester from Example C 1
179.3 parts by wt. crosslinking agent of Ba 4
200.0 parts by wt. white pigment ($TiO_2$)
50.0 parts by wt. leveling agent—masterbatch
30.0 parts by wt. catalyst—masterbatch
200.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° < |
| 15'/200° C. | 50–60 | 100 | 5.9–7.2 | 0 | 691.2 | 19 |
| 20'/200° C. | 60 | 100 | 6.4 | 0 | 576 | 21 |
| 25'/200° C. | 50–60 | 100 | 6.9–7.0 | 0 | 576 | 21 |
| 20'/190° C. | 50–60 | 100 | 4.4–5.1 | 0 | 115.2 | 24 |
| 25'/190° C. | 55–65 | 100 | 4.8–5.5 | 0 | 115.2 | 23 |
| 30'/190° C. | 50–60 | 100 | 5.7–5.9 | 0 | 345.6 | 25 |

EXAMPLE 12

Pigmented paint

The powder paint with the following formula was prepared by the procedure described, applied, and baked between 190° and 200° C.
480.4 parts by wt. polyester from Example C 1
239.6 parts by wt. crosslinking agent of Ba 4
200.0 parts by wt. white pigment ($TiO_2$)
50.0 parts by wt. leveling agent—masterbatch
30.0 parts by wt. catalyst—masterbatch.

| Baking conditions Time/temp. | Mechanical characteristics | | | | | |
|---|---|---|---|---|---|---|
| | FT | HB | ET | GS | Imp. rev. | GG 60° < |
| 15'/200° C. | 60 | 111 | 5.0–6.0 | 0 | 230.4 | 20 |
| 20'/200° C. | 60 | 111 | 7.1–7.2 | 0 | 345.6 | 22 |
| 25'/200° C. | 70–80 | 111 | 7.5–7.7 | 0 | 345.6 | 22 |
| 20'/190° C. | 60–70 | 111 | 3.5–4.3 | 0 | 115.2 | 24 |

-continued

| Baking conditions Time/temp. | Mechanical characteristics | | | | | |
|---|---|---|---|---|---|---|
| | FT | HB | ET | GS | Imp. rev. | GG 60° ⦤ |
| 25'/190° C. | 60 | 111 | 4.4–4.9 | 0 | 115.2 | 25 |
| 30'/190° C. | 60–75 | 111 | 5.2–5.7 | 0 | 115.2 | 25 |

EXAMPLE 13

Pigmented paint

The powder paint with the following formula was prepared by the procedure described, applied, and baked between 190° and 200° C.
480.4 parts by wt. polyester from Example C 1
239.6 parts by wt. crosslinking agent of Ba 4
100.0 parts by wt. white pigment (TiO₂)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ⦤ |
| 15'/200° C. | 40–60 | 111 | 4.9–5.1 | 0 | 115.2 | 16 |
| 20'/200° C. | 50–60 | 111 | 5.3–5.7 | 0 | 230.4 | 16 |
| 25'/200° C. | 50–65 | 111 | 6.0–6.5 | 0 | 230.4 | 17 |
| 20'/190° C. | 55–65 | 111 | 4.1–4.3 | 0 | 115.2 | 19 |
| 25'/190° C. | 40–55 | 111 | 4.9–5.2 | 0 | 230.4 | 22 |
| 30'/190° C. | 50–60 | 111 | 5.7–5.9 | 0 | 115.2 | 22 |

EXAMPLE 14

Pigmented paint

The powder paint with the following formula was prepared by the procedure described, applied, and baked between 190° and 200° C.
340.7 parts by wt. polyester from Example C 1
179.3 parts by wt. crosslinking agent of Ba 4
390.0 parts by wt. DURCAL 5
50.0 parts by wt. leveling agent—masterbatch
30.0 parts by wt. catalyst—masterbatch
10.0 parts by wt. PRINTEX U ® (carbon black from the Degussa Company)

| Baking conditions Time/temp. | Mechanical characteristics | | | | | |
|---|---|---|---|---|---|---|
| | FT | HB | ET | GS | Imp. rev. | GG 60° ⦤ |
| 15'/200° C. | 40–50 | 100 | 4.5–4.9 | 0 | 115.2 | 21 |
| 20'/200° C. | 40–55 | 111 | 5.1–5.5 | 0 | 230.4 | 22 |
| 25'/200° C. | 50–60 | 100 | 5.7–6.2 | 0 | 230.4 | 21 |
| 20'/190° C. | 50–60 | 100 | 3.5–4.1 | 0 | 115.2 | 24 |
| 25'/190° C. | 40–50 | 111 | 4.5–4.8 | 0 | 115.2 | 23 |
| 30'/190° C. | 40–50 | 111 | 5.0–5.3 | 0 | 115.2 | 25 |

EXAMPLE 15

Pigmented paint

The powder paint with the following formula was prepared by the procedure described, applied, and baked between 190° and 200° C.
361.4 parts by wt. polyester from Example C 2
188.6 parts by wt. crosslinking agent of Ba 4
400.0 parts by wt. white pigment (TiO₂)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60° ⦤ |
| 15'/200° C. | 50–60 | 100 | 5.6–6.0 | 0 | 230.4 | 28 |
| 20'/200° C. | 50–60 | 100 | 5.7–6.3 | 0 | 115.2 | 25 |
| 25'/200° C. | 60–70 | 111 | 6.5–7.0 | 0 | 345.6 | 27 |
| 20'/190° C. | 60–70 | 111 | 3.1–3.7 | 0 | 115.2 | 30 |
| 25'/190° C. | 50–70 | 100 | 3.7–4.0 | 0 | 115.2 | 30 |
| 30'/190° C. | 50–60 | 100 | 4.5–4.6 | 0 | 115.2 | 31 |

EXAMPLE 16

Pigmented paint

The powder paint with the following formula was prepared by the procedure described, applied, and baked between 190° and 200° C.
361.4 parts by wt. polyester from Example C 2
188.6 parts by wt. crosslinking agent of Ba 4
300.0 parts by wt. white pigment (TiO₂)
50.0 parts by wt. leveling agent—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ⦤ |
| 15'/200° C. | 55–60 | 100 | 5.3–5.6 | 0 | 115.2 | 21 |
| 20'/200° C. | 50–60 | 100 | 5.8–6.2 | 0 | 230.4 | 23 |
| 25'/200° C. | 60–70 | 100 | 5.8–6.5 | 0 | 230.4 | 23 |
| 20'/190° C. | 50–60 | 100 | 2.9–3.3 | 0 | 115.2 | 26 |
| 25'/190° C. | 50–60 | 111 | 3.0–3.7 | 0 | 115.2 | 27 |
| 30'/190° C. | 45–65 | 100 | 4.0–4.1 | 0 | 115.2 | 26 |

EXAMPLE 17

Pigmented paint

The powder paint with the following formula was prepared by the procedure described, applied, and baked between 190° and 200° C.
380.6 parts by wt. polyester from Example C 3
169.4 parts by wt. crosslinking agent of Ba 4
400.0 parts by wt. white pigment (TiO₂)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60° ⦤ |
| 15'/200° C. | 60–70 | 111 | 4.2–4.6 | 0 | 115.2 | 30 |
| 20'/200° C. | 50–70 | 100 | 5.2–7.2 | 0 | 345.6 | 31 |
| 25'/200° C. | 60–75 | 111 | 5.7–7.0 | 0 | 345.6 | 30 |
| 20'/190° C. | 60–75 | 111 | 3.1–3.5 | 0 | 115.2 | 36 |
| 25'/190° C. | 60–70 | 111 | 3.7–4.2 | 0 | 115.2 | 35 |
| 30'/190° C. | 60 | 125 | 4.7–5.1 | 0 | 230.4 | 37 |

EXAMPLE 18

Pigmented paint

The powder paint with the following formula was prepared by the procedure described, applied, and baked between 190° and 200° C.
351.0 parts by wt. polyester from Example C 3
169.0 parts by wt. crosslinking agent of Ba 4
300.0 parts by wt. white pigment (TiO₂)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 50–60 | 111 | 6.5–7.0 | 0 | 115.2 | 21 |
| 20'/200° C. | 60–70 | 100 | 5.7–6.4 | 0 | 230.4 | 21 |
| 25'/200° C. | 80 | 100 | 5.6–6.7 | 0 | 345.6 | 20 |
| 20'/190° C. | 60–70 | 111 | 2.9–3.8 | 0 | <115.2 | 26 |
| 25'/190° C. | 60–70 | 100 | 3.0–3.7 | 0 | 115.2 | 24 |
| 30'/190° C. | 60–70 | 111 | 4.3–4.8 | 0 | 115.2 | 25 |

EXAMPLE 19

Pigmented paint

The powder paint with the following formula was prepared by the procedure described, applied, and baked between 190° and 200° C.
284.5 parts by wt. polyester from Example C 4
235.5 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 40–50 | 100 | 4.8–5.0 | 0 | 230.4 | 34 |
| 20'/200° C. | 60 | 100 | 4.9–5.5 | 0 | 230.4 | 36 |
| 25'/200° C. | 60 | 100 | 5.0–5.5 | 0 | 345.6 | 35 |
| 20'/190° C. | 40–55 | 111 | 2.3–3.1 | 0 | <115.2 | 38 |
| 25'/190° C. | 40–60 | 100 | 3.4–4.0 | 0 | 115.2 | 40 |
| 30'/190° C. | 50 | 111 | 4.0–4.2 | 0 | 115.2 | 39 |

EXAMPLE 20

Pigmented paint

The powder paint with the following formula was prepared by the procedure described, applied, and baked between 190° and 200° C.
324.8 parts by wt. polyester from Example C 5
195.2 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 70–80 | 100 | 5.9–6.2 | 0 | 345.6 | 46 |
| 20'/200° C. | 80–90 | 100 | 6.0–6.3 | 0 | 345.6 | 45 |
| 25'/200° C. | 60–70 | 100 | 6.9–7.5 | 0 | 576 | 45 |
| 25'/190° C. | 70–80 | 100 | 2.9–4.0 | 0 | <115.2 | 48 |
| 30'/190° C. | 60–70 | 100 | 5.0–5.2 | 0 | 230.4 | 50 |

EXAMPLE 21

Pigmented paint

The powder paint with the following formula was prepared by the procedure described, applied, and baked between 190° and 200° C.
382.3 parts by wt. polyester from Example C 6
137.7 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 70–80 | 125 | 7.2–7.3 | 0 | 115.2 | 40 |
| 20'/200° C. | 70–80 | 100 | 6.4–7.2 | 0 | 230.4 | 41 |
| 25'/200° C. | 80–90 | 111 | 7.5–8.4 | 0 | 460.8 | 43 |
| 20'/190° C. | 70–80 | 111 | 4.6–5.3 | 0 | 115.2 | 47 |
| 25'/190° C. | 80–90 | 111 | 5.2–5.6 | 0 | 115.2 | 46 |
| 30'/190° C. | 60–80 | 125 | 6.2–6.6 | 0 | 230.4 | 48 |

EXAMPLE 22

Pigmented paint

The powder paint with the following formula was prepared by the procedure described, applied, and baked between 190° and 200° C.
380.2 parts by wt. polyester from Example C 7
139.8 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 60–80 | 111 | 7.0–8.0 | 0 | 806.4 | 41 |
| 20'/200° C. | 80 | 111 | 7.5–8.3 | 0 | 691.2 | 38 |
| 25'/200° C. | 50–60 | 111 | 8.3–8.6 | 0 | 806.4 | 41 |
| 20'/190° C. | 80 | 111 | 6.0 | 0 | 115.2 | 47 |
| 25'/190° C. | 70–80 | 111 | 5.8–6.3 | 0 | 230.4 | 46 |
| 30'/190° C. | 70–80 | 111 | 6.2–6.7 | 0 | 345.6 | 45 |

EXAMPLE 23

Pigmented paint

The powder paint with the following formula was prepared by the procedure described, applied, and baked between 190° and 200° C.
338.4 parts by wt. polyester from Example C 8
181.6 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 50–60 | 125 | 4.2–4.7 | 0 | 115.2 | 46 |
| 20'/200° C. | 60–80 | 111 | 4.8–5.2 | 0 | 115.2 | 46 |
| 25'/200° C. | 60 | 125 | 6.2–6.4 | 0 | 230.4 | 48 |
| 20'/190° C. | 60 | 125 | 3.0–4.5 | 0 | <115.2 | 50 |
| 25'/190° C. | 60–70 | 125 | 4.0–4.2 | 0 | 115.2 | 52 |
| 30'/190° C. | 70–80 | 125 | 4.6–4.8 | 0 | 115.2 | 49 |

EXAMPLE 24

Pigmented paint

The powder paint with the following formula was prepared by the procedure described, applied, and baked between 190° and 200° C.
362.3 parts by wt. polyester from Example C 9

187.7 parts by wt. crosslinking agent of Ba 4
400.0 parts by wt. white pigment (TiO$_2$)
50.0 parts by wt. leveling agent—masterbatch.

| Baking conditions | Mechanical characteristics | | | | | |
|---|---|---|---|---|---|---|
| Time/temp. | FT | HB | ET | GS | Imp. rev. | GG 60° ⊀ |
| 15'/200° C. | 50–60 | 111 | 3.6–4.1 | 0 | <115.2 | 48 |
| 20'/200° C. | 60–70 | 111 | 3.9–4.7 | 0 | 230.4 | 50 |
| 25'/200° C. | 50–75 | 125 | 4.0–4.8 | 0 | 115.2 | 50 |
| 25'/190° C. | 60–70 | 111 | 2.7–3.0 | 0 | <115.2 | 53 |
| 30'/190° C. | 50–60 | 111 | 2.9–3.3 | 0 | <115.2 | 56 |

EXAMPLE 25

Pigmented paint

The powder paint with the following formula was prepared by the procedure described, applied, and baked between 190° and 200° C.
362.3 parts by wt. polyester from Example C 9
187.7 parts by wt. crosslinking agent of Ba 4
300.0 parts by wt. white pigment (TiO$_2$)
50.0 parts by wt. leveling agent—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ⊀ |
| 15'/200° C. | 50–60 | 111 | 3.0–3.6 | 0 | <115.2 | 42 |
| 20'/200° C. | 40–60 | 111 | 3.7–4.0 | 0 | 230.4 | 44 |
| 25'/200° C. | 50–65 | 125 | 4.2–4.5 | 0 | 230.4 | 42 |
| 25'/190° C. | 50–60 | 111 | 2.5–3.0 | 0 | <115.2 | 46 |
| 30'/190° C. | 50–65 | 125 | 2.7–3.1 | 0 | <115.2 | 47 |

EXAMPLE 26

Pigmented paint

The powder paint with the following formula was prepared by the procedure described, applied, and baked between 190° and 200° C.
331.3 parts by wt. polyester from Example C 9
188.7 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | NB | ET | GS | Imp. rev. | GG 60° ⊀ |
| 15'/200° C. | 50–60 | 100 | 3.7–4.1 | 0 | <115.2 | 43 |
| 20'/200° C. | 60–70 | 100 | 3.9–4.5 | 0 | 115.2 | 40 |
| 25'/200° C. | 60–70 | 100 | 4.5–4.7 | 0 | 115.2 | 44 |
| 25'/190° C. | 60–70 | 111 | 3.0–3.3 | 0 | <115.2 | 48 |
| 30'/190° C. | 60–80 | 111 | 3.6–3.9 | 0 | <115.2 | 46 |

EXAMPLE 27

Pigmented paint

The powder paint with the following formula was prepared by the procedure described, applied, and baked between 190° and 200° C.
346.2 parts by wt. polyester from Example C 10
173.8 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ⊀ |
| 15'/200° C. | 60–70 | 111 | 5.8–6.1 | 0 | 345.6 | 33 |
| 20'/200° C. | 80 | 125 | 5.1–5.7 | 0 | 230.4 | 36 |
| 25'/200° C. | 60 | 125 | 5.6–6.3 | 0 | 345.6 | 33 |

EXAMPLE 28

Pigmented paint

The powder paint with the following formula was prepared by the procedure described, applied, and baked between 190° and 200° C.
366.1 parts by wt. polyester from Example C 11
153.9 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ⊀ |
| 15'/200° C. | 60–80 | 100 | 4.4–5.9 | 0 | 230.4 | 35 |
| 20'/200° C. | 70–90 | 100 | 4.8–6.0 | 0 | 345.6 | 36 |
| 25'/200° C. | 80–90 | 100 | 4.7–5.7 | 0 | 345.6 | 34 |

EXAMPLE 29

Pigmented paint

The powder paint with the following formula was prepared by the procedure described, applied, and baked between 190° and 200° C.
370.3 parts by wt. polyester from Example C 1
179.7 parts by wt. crosslinking agent of Ba 5
400.0 parts by wt. white pigment (TiO$_2$)
50.0 parts by wt. leveling agent—masterbatch.

| Baking conditions | Mechanical characteristics | | | | | |
|---|---|---|---|---|---|---|
| Time/temp. | FT | HB | ET | GS | Imp. rev. | GG 60° ⊀ |
| 15'/200° C. | 40–50 | 125 | 4.8–6.6 | 0 | 115.2 | 23 |
| 20'/200° C. | 50–65 | 125 | 4.7–5.9 | 0 | 115.2 | 23 |
| 25'/200° C. | 40–50 | 125 | 6.7–6.9 | 0 | 230.4 | 23 |
| 20'/190° C. | 40–55 | 111 | 3.7–4.1 | 0 | <115.2 | 26 |
| 25'/190° C. | 50–60 | 125 | 4.1–4.5 | 0 | 115.2 | 25 |
| 30'/190° C. | 40–50 | 111 | 4.2–4.7 | 0 | 115.2 | 24 |

EXAMPLE 30

Pigmented paint

The powder paint with the following formula was prepared by the procedure described, applied, and baked between 190° and 200° C.
321.7 parts by wt. polyester from Example C 1
198.3 parts by wt. crosslinking agent of Ba 5
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 50–60 | 111 | 7.8–8.2 | 0 | 806.4 | 28 |
| 20'/200° C. | 50–60 | 111 | 7.4–7.8 | 0 | 806.4 | 31 |
| 25'/200° C. | 50–60 | 125 | 8.1–8.2 | 0 | 806.4 | 30 |
| 20'/190° C. | 60 | 125 | 4.2–4.5 | 0 | 115.2 | 34 |
| 25'/190° C. | 60–70 | 111 | 5.0–5.7 | 0 | 230.4 | 35 |
| 30'/190° C. | 60 | 100 | 7.0–7.2 | 0 | 230.4 | 33 |

EXAMPLE 31

Pigmented paint

The powder paint with the following formula was prepared by the procedure described, applied, and baked between 190° and 200° C.
264.3 parts by wt. polyester from Example C 1
120.7 parts by wt. crosslinking agent of Ba 6
400.0 parts by wt. white pigment (TiO$_2$)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 40–60 | 111 | 4.5–5.1 | 0 | 115.2 | 36 |
| 20'/200° C. | 60 | 111 | 5.0–5.5 | 0 | 230.4 | 36 |
| 25'/200° C. | 40–60 | 111 | 5.7–6.2 | 0 | 345.6 | 38 |
| 20'/190° C. | 60 | 111 | 3.3–3.6 | 0 | 115.2 | 36 |
| 25'/190° C. | 40–60 | 111 | 3.7–4.0 | 0 | 115.2 | 38 |
| 30'/190° C. | 40–60 | 111 | 4.2–4.5 | 0 | 230.4 | 38 |

EXAMPLE 32

Pigmented paint

The powder paint with the following formula was prepared by the procedure described, applied, and baked between 190° and 200° C.
348.0 parts by wt. polyester from Example C 1
172.0 parts by wt. crosslinking agent of Ba 6
400.0 parts by wt. white pigment (TiO$_2$)
50.0 parts by wt. leveling agent—masterbatch
30.0 parts by wt. catalyst—masterbatch.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 40–50 | 125 | 4.6–5.7 | 0 | 115.2 | 30 |
| 20'/200° C. | 40–50 | 125 | 5.1–5.7 | 0 | 230.4 | 29 |
| 25'/200° C. | 50 | 125 | 6.0–6.1 | 0 | 345.6 | 30 |
| 20'/190° C. | 50–55 | 100 | 3.7–4.0 | 0 | 115.2 | 31 |
| 25'/190° C. | 40–50 | 111 | 3.9–4.3 | 0 | 115.2 | 31 |
| 30'/190° C. | 40–50 | 125 | 4.4–4.9 | 0 | 230.4 | 30 |

EXAMPLE 33

Pigmented paint

The powder paint with the following formula was prepared by the procedure described, applied, and baked between 190° and 200° C.
243.6 parts by wt. polyester from Example C 1
121.4 parts by wt. crosslinking agent of Ba 6
210.0 parts by wt. white pigment (TiO$_2$)
35.0 parts by wt. leveling agent—masterbatch
21.0 parts by wt. catalyst—masterbatch
70.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 40–60 | 111 | 5.1–5.5 | 0 | 115.2 | 34 |
| 20'/200° C. | 40 | 111 | 5.4–5.5 | 0 | 345.6 | 35 |
| 25'/200° C. | 60 | 111 | 5.5–6.0 | 0 | 230.4 | 37 |
| 20'/190° C. | 55–60 | 100 | 3.5–3.6 | 0 | <115.2 | 32 |
| 25'/190° C. | 50–60 | 111 | 3.7–4.0 | 0 | 115.2 | 35 |
| 30'/190° C. | 50–60 | 100 | 3.9–4.4 | 0 | 115.2 | 32 |

EXAMPLE 34

Pigmented paint

The powder paint with the following formula was prepared by the procedure described, applied, and baked between 190° and 200° C.
342.1 parts by wt. polyester from Example C 9
177.9 parts by wt. crosslinking agent of Ba 6
400.0 parts by wt. white pigment (TiO$_2$)
50.0 parts by wt. leveling agent—masterbatch
30.0 parts by wt. catalyst—masterbatch.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 60 | 111 | 4.0–4.8 | 0 | 115.2 | 55 |
| 20'/200° C. | 60–65 | 111 | 4.2–5.1 | 0 | 115.2 | 56 |
| 25'/200° C. | 55–65 | 125 | 5.3–5.7 | 0 | 230.4 | 55 |
| 20'/190° C. | 55–60 | 111 | 3.0–3.5 | 0 | 115.2 | 56 |
| 25'/190° C. | 50–60 | 125 | 3.3–3.9 | 0 | 115.2 | 52 |
| 30'/190° C. | 50–60 | 125 | 3.9–4.1 | 0 | 230.4 | 54 |

EXAMPLE 35

Pigmented paint

The powder paint with the following formula was prepared by the procedure described, applied, and baked between 190° and 200° C.
369.0 parts by wt. polyester from Example C 1
181.0 parts by wt. crosslinking agent of Ba 7
400.0 parts by wt. white pigment (TiO$_2$)
50.0 parts by wt. leveling agent—masterbatch.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 40–50 | 100 | 4.8–6.0 | 0 | 345.6 | 55 |
| 20'/200° C. | 40–50 | 111 | 7.0 | 0 | 576 | 55 |
| 25'/200° C. | 40–50 | 100 | 6.6–7.8 | 0 | 576 | 52 |
| 20'/190° C. | 40–50 | 111 | 5.2–5.8 | 0 | 345.6 | 57 |
| 25'/190° C. | 40–55 | 111 | 5.0–6.0 | 0 | 460.8 | 58 |
| 30'/190° C. | 40–50 | 100 | 5.3–6.2 | 0 | 576 | 56 |

EXAMPLE 36

Pigmented paint

The powder paint with the following formula was prepared by the procedure described, applied, and baked between 190° and 200° C.
393.3 parts by wt. polyester from Example C 1
156.7 parts by wt. crosslinking agent of Ba 8
400.0 parts by wt. white pigment (TiO$_2$)
50.0 parts by wt. leveling agent—masterbatch.

| Baking conditions Time/temp. | FT | HB | ET | GS | Imp. rev. | GG 60° ≮ |
|---|---|---|---|---|---|---|
| 15'/200° C. | 50-60 | 100 | 5.1-5.9 | 0 | 576 | 56 |
| 20'/200° C. | 60 | 100 | 5.1-6.0 | 0 | 576 | 59 |
| 25'/200° C. | 40-50 | 100 | 7.0-8.0 | 0 | 691.2 | 56 |
| 20'/190° C. | 50-60 | 100 | 4.5-4.9 | 0 | 345.6 | 57 |
| 25'/190° C. | 50-60 | 100 | 5.3-5.5 | 0 | 576 | 59 |
| 30'/190° C. | 60 | 100 | 5.9-6.2 | 0 | 460.8 | 59 |

EXAMPLE 37

Pigmented paint

The powder paint with the following formula was prepared by the procedure described, applied, and baked between 190° and 200° C.
363.7 parts by wt. polyester from Example C 1
156.3 parts by wt. crosslinking agent of Ba 8
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | FT | HB | ET | GS | Imp. rev. | GG 60° ≮ |
|---|---|---|---|---|---|---|
| 15'/200° C. | 50-65 | 100 | 4.8-5.0 | 0 | 230.4 | 51 |
| 20'/200° C. | 60-70 | 100 | 5.2-5.7 | 0 | 345.6 | 50 |
| 25'/200° C. | 50-60 | 100 | 5.7-6.5 | 0 | 460.8 | 51 |
| 20'/190° C. | 60-70 | 100 | 3.9-4.5 | 0 | 115.2 | 53 |
| 25'/190° C. | 55-65 | 100 | 4.5-4.7 | 0 | 230.4 | 55 |
| 30'/190° C. | 60-70 | 100 | 4.4-4.9 | 0 | 230.4 | 55 |

EXAMPLE 38

Pigmented paint

The powder paint with the following formula was prepared by the procedure described, applied, and baked between 190° and 200° C.
341.3 parts by wt. polyester from Example C 1
153.7 parts by wt. crosslinking agent of Ba 9
360.0 parts by wt. white pigment (TiO$_2$)
45.0 parts by wt. leveling agent—masterbatch.

| Baking conditions Time/temp. | FT | HB | ET | GS | Imp. rev. | GG 60° ≮ |
|---|---|---|---|---|---|---|
| 15'/200° C. | 40-50 | 100 | 5.4-6.3 | 0 | 115.2 | 27 |
| 20'/200° C. | 40-50 | 100 | 5.9-6.5 | 0 | 230.4 | 27 |
| 25'/200° C. | 50-60 | 111 | 6.2-7.5 | 0 | 460.8 | 26 |
| 20'/190° C. | 40-50 | 111 | 4.0-4.5 | 0 | 115.2 | 31 |
| 25'/190° C. | 50-60 | 100 | 4.9-5.3 | 0 | 345.6 | 33 |
| 30'/190° C. | 40-55 | 100 | 5.2-5.7 | 0 | 345.6 | 33 |

EXAMPLE 39

Pigmented paint

The powder paint with the following formula was prepared by the procedure described, applied, and baked between 190° and 200° C.
348.0 parts by wt. polyester from Example C 1
172.0 parts by wt. crosslinking agent of Ba 9
400.0 parts by wt. white pigment (TiO$_2$)
50.0 parts by wt. leveling agent—masterbatch
30.0 parts by wt. catalyst—masterbatch.

| Baking conditions Time/temp. | FT | HB | ET | GS | Imp. rev. | GG 60° ≮ |
|---|---|---|---|---|---|---|
| 15'/200° C. | 40-50 | 111 | 6.2-6.4 | 0 | 576 | 26 |
| 20'/200° C. | 40-50 | 111 | 6.6-7.0 | 0 | 806.4 | 27 |
| 25'/200° C. | 40-50 | 111 | 7.0 | 0 | 806.4 | 27 |
| 20'/190° C. | 40-50 | 111 | 5.1-5.3 | 0 | 460.8 | 30 |
| 25'/190° C. | 50-60 | 100 | 5.0-5.5 | 0 | 460.8 | 29 |
| 30'/190° C. | 40-50 | 111 | 6.0-6.6 | 0 | 576 | 31 |

EXAMPLE 40

Pigmented paint

The powder paint with the following formula was prepared by the procedure described, applied, and baked between 190° and 200° C.
314.7 parts by wt. polyester from Example C 1
153.3 parts by wt. crosslinking agent of Ba 9*
270.0 parts by wt. white pigment (TiO$_2$)
45.0 parts by wt. leveling agent—masterbatch
27.0 parts by wt. catalyst—masterbatch
90.0 parts by wt. DURCAL 5.
* The paint characteristics are identical within the limits of error when using the crosslinking agent Bb 2.

| Baking conditions Time/temp. | FT | HB | ET | GS | Imp. rev. | GG 60° ≮ |
|---|---|---|---|---|---|---|
| 15'/200° C. | 50-60 | 111 | 4.7-5.0 | 0 | 115.2 | 22 |
| 20'/200° C. | 50-60 | 111 | 5.1-6.1 | 0 | 345.6 | 20 |
| 25'/200° C. | 40-55 | 111 | 6.0-6.3 | 0 | 345.6 | 21 |
| 20'/190° C. | 50-60 | 111 | 3.8-4.1 | 0 | 115.2 | 24 |
| 25'/190° C. | 50-60 | 111 | 4.3-4.7 | 0 | 230.4 | 23 |
| 30'/190° C. | 50-60 | 111 | 4.8-5.5 | 0 | 230.4 | 25 |

EXAMPLE 41

Pigmented paint

The powder paint with the following formula was prepared by the procedure described, applied, and baked between 190° and 200° C.
349.2 parts by wt. polyester from Example C 9
170.8 parts by wt. crosslinking agent of Ba 9
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | FT | HB | ET | GS | Imp. rev. | GG 60° ≮ |
|---|---|---|---|---|---|---|
| 15'/200° C. | 60-75 | 100 | 4.1-4.5 | 0 | 115.2 | 42 |
| 20'/200° C. | 60-80 | 100 | 4.7-5.2 | 0 | 230.4 | 41 |
| 25'/200° C. | 60 | 111 | 5.7-6.0 | 0 | 345.6 | 42 |
| 20'/190° C. | 50-60 | 100 | 3.9-4.2 | 0 | <115.2 | 46 |
| 25'/190° C. | 60-70 | 111 | 4.4-4.9 | 0 | 115.2 | 45 |
| 30'/190° C. | 50-70 | 111 | 5.2-5.7 | 0 | 230.4 | 45 |

EXAMPLE 42

Pigmented paint

The powder paint with the following formula was prepared by the procedure described, applied, and baked between 190° and 200° C.
371.7 parts by wt. polyester from Example C 11
148.3 parts by wt. crosslinking agent of Ba 9

400.0 parts by wt. white pigment (TiO$_2$)
50.0 parts by wt. leveling agent—masterbatch
30.0 parts by wt. catalyst—masterbatch.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 55–60 | 111 | 6.8–7.5 | 0 | 230.4 | 55 |
| 20'/200° C. | 50–60 | 111 | 7.4–7.9 | 0 | 576 | 54 |
| 25'/200° C. | 50–60 | 111 | 8.1–8.6 | 0 | 691.2 | 55 |
| 20'/190° C. | 60–65 | 111 | 5.2–5.7 | 0 | 230.4 | 57 |
| 25'/190° C. | 50–60 | 111 | 6.0–6.1 | 0 | 460.8 | 58 |
| 30'/190° C. | 50–60 | 111 | 6.7–7.3 | 0 | 576 | 57 |

EXAMPLE 43

Pigmented paint

The powder paint with the following formula was prepared by the procedure described, applied, and baked between 190° and 200° C.
349.1 parts by wt. polyester from Example C 1
170.9 parts by wt. crosslinking agent of Bc 1
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 60 | 111 | >10 | 0 | >944.6 | 48 |
| 20'/200° C. | 60–70 | 111 | >10 | 0 | >944.6 | 50 |
| 25'/200° C. | 70–80 | 100 | >10 | 0 | >944.6 | 50 |
| 20'/190° C. | 60 | 111 | 9.8–>10 | 0 | >944.6 | 54 |
| 25'/190° C. | 60–75 | 111 | >10 | 0 | >944.6 | 52 |
| 30'/190° C. | 70–80 | 111 | 9.8–>10 | 0 | >944.6 | 55 |

EXAMPLE 44

Pigmented paint

The powder paint with the following formula was prepared by the procedure described, applied, and baked between 190° and 200° C.
347.9 parts by wt. polyester from Example C 1
172.1 parts by wt. crosslinking agent of Bd 1
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 50–60 | 111 | >10 | 0 | >944.6 | 48 |
| 20'/200° C. | 60–70 | 111 | >10 | 0 | >944.6 | 48 |
| 25'/200° C. | 60–70 | 125 | >10 | 0 | >944.6 | 46 |
| 20'/190° C. | 60–80 | 100 | >10 | 0 | >944.6 | 50 |
| 25'/190° C. | 60–70 | 111 | >10 | 0 | >944.6 | 52 |
| 30'/190° C. | 50–60 | 111 | >10 | 0 | >944.6 | 53 |

EXAMPLE 45

Pigmented paint

The powder paint with the following formula was prepared by the procedure described, applied, and baked between 190° and 200° C.
355.7 parts by wt. polyester from Example C 1
164.3 parts by wt. crosslinking agent of Bd 2
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 60–70 | 111 | >10 | 0 | >944.6 | 47 |
| 20'/200° C. | 60–70 | 111 | >10 | 0 | >944.6 | 49 |
| 25'/200° C. | 70–80 | 111 | >10 | 0 | >944.6 | 48 |
| 20'/190° C. | 70–80 | 111 | >10 | 0 | >944.6 | 50 |
| 25'/190° C. | 60–70 | 100 | >10 | 0 | >944.6 | 51 |
| 30'/190° C. | 60–75 | 111 | >10 | 0 | >944.6 | 53 |

EXAMPLE 46

Pigmented paint

The powder paint with the following formula was prepared by the procedure described, applied, and baked between 190° and 200° C.
344.4 parts by wt. polyester from Example C 1
175.6 parts by wt. crosslinking agent of Be 1*
300.0 parts by wt. white pigment (TiO$_2$)
50.0 parts by wt. leveling agent—masterbatch
30.0 parts by wt. catalyst—masterbatch
100.0 parts by wt. DURCAL 5.

* The paint characteristics are identical within the limits of error when using the crosslinking agents Be 2 and Be 3; Be 2 and Be 3 show a slight orange-peel structure.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 50–60 | 125 | 5.0–5.2 | 0 | 115.2 | 19 |
| 20'/200° C. | 50–60 | 111 | 5.3–5.7 | 0 | 230.4 | 20 |
| 25'/200° C. | 60–65 | 125 | 6.0–6.5 | 0 | 115.2 | 19 |
| 20'/190° C. | 60–65 | 111 | 3.9–4.2 | 0 | 115.2 | 22 |
| 25'/190° C. | 50–60 | 125 | 4.4–4.8 | 0 | 230.4 | 24 |
| 30'/190° C. | 60–70 | 111 | 5.2–5.7 | 0 | 230.4 | 25 |

EXAMPLE 47

Pigmented paint

The powder paint with the following formula was prepared by the procedure described, applied, and baked between 190° and 200° C.
339.5 parts by wt. polyester from Example C 1
180.5 parts by wt. crosslinking agent of Bf 1
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ≮ |
| 15'/200° C. | 60–65 | 125 | 4.5–5.1 | 0 | 115.2 | 25 |
| 20'/200° C. | 60–70 | 125 | 5.4–5.7 | 0 | 230.4 | 28 |
| 25'/200° C. | 60–70 | 111 | 6.0–6.2 | 0 | 345.6 | 27 |
| 20'/190° C. | 60 | 111 | 3.9–4.5 | 0 | 115.2 | 30 |
| 25'/190° C. | 70–80 | 125 | 4.3–4.8 | 0 | 115.2 | 33 |
| 30'/190° C. | 70–80 | 111 | 4.7–5.3 | 0 | 230.4 | 34 |

EXAMPLE 48

Pigmented paint

The powder paint with the following formula was prepared by the procedure described, applied, and baked between 190° and 200° C.
349.1 parts by wt. polyester from Example C 1
170.9 parts by wt. crosslinking agent of Bf 2
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ⋖ |
| 15'/200° C. | 60 | 100 | 7.1–7.9 | 0 | 691.2 | 28 |
| 20'/200° C. | 60 | 100 | 8.2 | 0 | 691.2 | 28 |
| 25'/200° C. | 60–70 | 100 | 7.5–8.0 | 0 | 576 | 31 |
| 20'/190° C. | 70–80 | 111 | 4.8–5.8 | 0 | 230.4 | 34 |
| 25'/190° C. | 60–70 | 111 | 5.1–5.9 | 0 | 230.4 | 36 |
| 30'/190° C. | 70 | 111 | 5.4–6.9 | 0 | 345.6 | 35 |

EXAMPLE 49

Pigmented paint

The powder paint with the following formula was prepared by the procedure described, applied, and baked between 190° and 200° C.
362.7 parts by wt. polyester from Example C 1
157.3 parts by wt. crosslinking agent of Bf 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ⋖ |
| 15'/200° C. | 60–70 | 111 | 7.1–7.5 | 0 | 460.8 | 43 |
| 20'/200° C. | 40–50 | 100 | 8.3–8.4 | 0 | 806.4 | 40 |
| 25'/200° C. | 70–80 | 100 | 7.0–7.2 | 0 | 460.8 | 42 |
| 20'/190° C. | 60–70 | 100 | 4.1–4.6 | 0 | 115.2 | 45 |
| 25'/190° C. | 70–80 | 111 | 4.5–4.9 | 0 | 115.2 | 47 |
| 30'/190° C. | 60–70 | 100 | 4.7–5.2 | 0 | 230.4 | 46 |

EXAMPLE 50

Pigmented paint

The powder paint with the following formula was prepared by the procedure described, applied, and baked between 190° and 200° C.
324.6 parts by wt. polyester from Example C 1
185.4 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ⋖ |
| 15'/200° C. | 40–50 | 125 | 3.9–4.4 | 0 | 230.4 | 22 |
| 20'/200° C. | 40–50 | 125 | 5.9–6.4 | 0 | 230.4 | 22 |
| 25'/200° C. | 50–60 | 125 | 6.3–6.8 | 0 | 460.8 | 23 |
| 20'/190° C. | 50–60 | 125 | 3.2–3.8 | 9 | 115.2 | 25 |
| 25'/190° C. | 40–50 | 125 | 3.9–4.1 | 0 | 115.2 | 24 |
| 30'/190° C. | 50 | 125 | 4.5–4.7 | 0 | 230.4 | 26 |

EXAMPLE 51

Pigmented paint

The powder paint with the following formula was prepared by the procedure described, applied, and baked between 190° and 200° C.
328.6 parts by wt. polyester from Example C 1
191.4 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ⋖ |
| 15'/200° C. | 45–55 | 100 | 6.3–6.8 | 0 | 345.6 | 21 |
| 20'/200° C. | 60 | 100 | 6.8–7.0 | 0 | 460.8 | 22 |
| 25'/200° C. | 50–60 | 111 | 7.2–7.4 | 0 | 576 | 21 |
| 20'/190° C. | 50–60 | 111 | 4.2–4.4 | 0 | 115.2 | 26 |
| 25'/190° C. | 60–70 | 100 | 5.1–5.5 | 0 | 115.2 | 26 |
| 30'/190° C. | 50–60 | 111 | 4.9–5.3 | 0 | 230.4 | 27 |

EXAMPLE 52

Pigmented paint

The powder paint with the following formula was prepared by the procedure described, applied, and baked between 190° and 200° C.
367.4 parts by wt. polyester from Example C 1
152.6 parts by wt. crosslinking agent of Ba 4
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions Time/temp. | Mechanical characteristics | | | | | |
|---|---|---|---|---|---|---|
| | FT | HB | ET | GS | Imp. rev. | GG 60° ⋖ |
| 15'/200° C. | 50–60 | 111 | 6.8–7.4 | 0 | 345.6 | 27 |
| 20'/200° C. | 40–50 | 111 | 8.1–8.3 | 0 | 460.8 | 26 |
| 25'/200° C. | 60 | 111 | 7.5–8.0 | 0 | 460.8 | 28 |
| 20'/190° C. | 50–60 | 111 | 7.4–8.1 | 0 | 576 | 31 |
| 25'/190° C. | 50–60 | 111 | 7.6–8.0 | 0 | 460.8 | 34 |
| 30'/190° C. | 50–60 | 111 | 7.5–7.7 | 0 | 576 | 35 |

EXAMPLE 53

Pigmented paint

The powder paint with the following formula was prepared by the procedure described, applied, and baked between 190° and 200° C.
334.3 parts by wt. polyester from Example C 1
185.7 parts by wt. crosslinking agent of Bg 1
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 50–60 | 100 | 4.1–4.8 | 0 | 460.8 | 22 |
| 20'/200° C. | 60 | 100 | 5.6–6.2 | 0 | 576 | 22 |
| 25'/200° C. | 50–60 | 100 | 5.8–6.7 | 0 | 576 | 23 |
| 20'/190° C. | 60 | 100 | 3.5–4.2 | 0 | 115.2 | 25 |
| 25'/190° C. | 50'60 | 100 | 4.4–4.5 | 0 | 115.2 | 24 |
| 30'/190° C. | 70–80 | 100 | 4.8–4.9 | 0 | 230.4 | 26 |

EXAMPLE 54

Pigmented paint

The powder paint with the following formula was prepared by the procedure described, applied, and baked between 190° and 200° C.
343.2 parts by wt. polyester from Example C 1
176.8 parts by wt. crosslinking agent of Bg 2
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 40–50 | 100 | 7.1–8.0 | 0 | 576 | 22 |
| 20'/200° C. | 40–50 | 100 | 7.2–7.7 | 0 | 691.2 | 23 |
| 25'/200° C. | 40–50 | 111 | 7.6–8.1 | 0 | 806.4 | 22 |
| 20'/190° C. | 40–50 | 100 | 4.8–5.2 | 0 | 230.4 | 22 |
| 25'/190° C. | 40–60 | 100 | 5.3–5.7 | 0 | 345.6 | 22 |
| 30'/190° C. | 40–60 | 100 | 4.6–5.9 | 0 | 345.6 | 23 |

EXAMPLE 55

Pigmented paint

The powder paint with the following formula was prepared by the procedure described, applied, and baked between 190° and 200° C.
354.6 parts by wt. polyester from Example C 1
165.4 parts by wt. crosslinking agent of Bg 6
300.0 parts by wt. white pigment (TiO$_2$)
50.0 parts by wt. leveling agent—masterbatch
30.0 parts by wt. catalyst—masterbatch
100.0 parts by wt. DURCAL 5.

| Baking conditions | Mechanical characteristics | | | | | |
|---|---|---|---|---|---|---|
| Time/temp. | FT | HB | ET | GS | Imp. rev. | GG 60° ≮ |
| 15'/200° C. | 60–70 | 100 | 5.0–5.3 | 0 | 460.8 | 36 |
| 20'/200° C. | 60–70 | 111 | 5.2–6.2 | 0 | 460.8 | 35 |
| 25'/200° C. | 60–70 | 111 | 5.3–6.0 | 0 | 576.0 | 37 |
| 20'/190° C. | 70–80 | 111 | 3.5–3.9 | 0 | 115.2 | 40 |
| 25'/190° C. | 60–70 | 125 | 4.1–4.3 | 0 | 115.2 | 42 |
| 30'/190° C. | 80–85 | 111 | 4.0–4.8 | 0 | 230.4 | 42 |

E. (I) Comparison Examples

General instructions for preparation (Partially blocked polyisocyanates without thin film evaporation)

To 1 mole of polyisocyanate is added 1 mole of blocking agent at from 90° to 110° C. in such a way that the temperature of the reaction mixture does not rise above 120° C. After the addition of the blocking agent is complete, the heating is continued until the NCO content of the reaction mixture has reached the calculated value. The chemical and physical characteristics of the reaction products are summarized in the following table:

| | Starting materials | | NCO content in wt. % | | Free Polyisocyanate | Viscosity in mPa.s at °C. | | | | |
|---|---|---|---|---|---|---|---|---|---|---|
| Examples E I | Poly- isocyanate | Blocking agent | free | total | wt. % | 25° C. | 30° C. | 40° C. | 50° C. | 70° C. |
| 1 | IPDI | Caprolactam | 12.4 | 24.85 | 15.8 | 381,000 | 142,000 | 27,800 | 6,650 | 690 |
| 2 | IPDI | MEK-oxime* | 12.4 | 26.0 | 15.3 | 27,000 | 14,750 | 3,390 | 1,100 | 195 |
| 3 | HDI | Caprolactam | 14.7 | 29.75 | 14.5 | 90 | 70 | 60 | 40 | <30 |
| 4 | HDI | MEK-oxime* | 16.4 | 31.5 | 14.5 | 75 | 55 | 35 | 30 | <30 |
| 5 | DI51 | Caprolactam | 14.5 | 29.0 | 14.3 | 190 | 140 | 70 | 40 | <30 |
| 6 | DI51 | MEK-oxime* | 16.2 | 31.7 | 17.7 | 110 | 85 | 45 | 30 | <30 |
| 7 | HMDI | Caprolactam | 10.9 | 21.9 | 17.0 | 880,000 | 300,000 | 600,000 | 9,000 | 1,100 |

*MEK-oxime = methylethylketoxime

E. (II) Comparison Examples (Polyisocyanate-urea adducts)

The partially blocked polyisocyanates of E I were reacted with the amine component according to the general instructions B for the preparation of the blocked polyisocyanate-urea adducts. The chemical and physical characteristics of the products are summarized in the following table:

| Examples E II | Polyiso- cyanate from E I | Amine component | NCO content in wt. % free | NCO content in wt. % latent | Melt- ing range in °C. | Glass transition temp. (DTA) °C. |
|---|---|---|---|---|---|---|
| 1 | 1 | 4,4'-diami- nodicyclo- hexylmethane | 9.4 | 0.2 | 158–160 | 19–110 |
| 2 | 3 | 4,4'-diami- nodicyclo- hexylmethane | 10.6 | 0.1 | 102–104 | 17–38 |
| 3 | 5 | 4,4'-diami- nodicyclo- hexylmethane | 10.8 | 0 | 90–92 | 14–34 |
| 4 | 7 | 4,4'-diami- nodicyclo- hexylmethane | 8.5 | 0 | 160–162 | 26–85 |
| 5 | 1 | IPD | 9.9 | 0 | 141–145 | 20–83 |

In all of the examples, more or less sever incompatibility (clumping) occurred even during the addition of amine, so that the reaction between the NCO groups and amino groups did not occur smoothly. The polyisocyanate-urea adducts still showed weak basicity.

E. (III) Paint Comparison Examples

1. PUR powder paints based on binder combinations—crosslinking agent pursuant to E II and polyester pursuant to C 1—in combination with the additives used in the invention lead to paint films with moderately severe to severe orange-peel structure and elevated gloss values, or to fine-grained to rough surfaces. In addition, the paint films tend to yellow more or less severely because of the residual basicity.

2. PUR powder paints based on crosslinking agents formed at reaction temperatures greater than 80° C. during the production process, in combination with the polyesters according to C and the additives used in the invention show pronounced orange-peel structure and elevated gloss.

What is claimed as new and desired to be secured by Letters Patent of the United States is:

1. A PUR powder paint for matt coatings, comprising:
   (i) a partially or completely blocked polyisocyanate-urea adduct obtained from the reaction of a partially blocked polyisocyanate obtained by adding one mole of a blocking agent to from 5 to 20 moles of a polyisocyanate and then reducing the amount of said polyisocyanate to less than 6.5 weight % of said partially blocked polyisocyanate by thin film evaporation, with a polyamine wherein said polyisocyanate-urea adduct contains a total amount of NCO groups of from 8 to 15 weight % and an amount of free NCO groups up to 4 weight %; and
   (ii) a hydroxyl group containing polymer with more than two hydroxyl groups per molecule.

2. The PUR powder paint of claim 1, wherein said total amount of NCO groups is from 9 to 13 weight % and said amount of free NCO groups is up to 3 weight %.

3. The PUR powder paint of claim 1, wherein said polyisocyanate has a boiling point under vacuum below the deblocking temperature of said blocking agent.

4. The PUR powder paint of claim 1, wherein said polyisocyanate is reduced to less than 2.5 weight % of said partially blocked polyisocyanate.

5. The PUR powder paint of claim 1, wherein said polyisocyanate is a aliphatic or (cyclo)aliphatic diisocyanate.

6. The PUR powder paint of claim 1, wherein said polyisocyanate is selected from the group consisting of 1,6-hexamethylene diisocyanate, 2-methyl-1,5-pentane diisocyanate, 2,2,4(2,4,4)-trimethyl-hexamethylene-diisocyanat-1,6.

7. The PUR powder paint of claim 5, wherein said diisocyanate is isophorone diisocyanate.

8. The PUR powder paint of claim 1, wherein said polyamine is an aliphatic, cycloaliphatic, heterocyclic, or aromatic diamine or polyamine.

9. The PUR powder paint of claim 8, wherein said diamine or polyamine is selected from the group consisting of 1,12-dodecamethylenediamine, 3,3′-dimethyl-4,4′-diaminodicyclohexylmethane, tetraethylenepentamine, pentaethylenehexamine, and 4,4′-diaminodiphenylmethane.

10. The PUR powder paint of claim 8, wherein said diamine is selected from the group consisting of 4,4′-diaminodicyclohexylmethane, bis(1,4-aminomethyl)cyclohexane, and isophoronediamine.

11. The PUR powder paint of claim 8, wherein said diamine is a mixture of isophoronediamine and an aliphatic diamine.

12. The PUR powder paint of claim 11, wherein said aliphatic diamine is 2,2,4-trimethyl-1,6-hexamethylenediamine or 2,4,4-trimethyl-1,6-hexamethylenediamine.

13. The PUR powder paint of claim 1, wherein said ratio of amino groups in said polyamine to said free NCO groups is from 1:1 to 1:1.3.

14. The PUR powder paint of claim 13, wherein said ratio if from 1:1 to 1:1.2.

15. The PUR powder paint of claim 1, wherein said hydroxyl group containing polymer is a polyester with an OH functionality of from 2.5 to 5, an average molecular weight of from 1,800 to 5,000, an OH number of from 25 to 120 mg KOH/g, a viscosity of less than 80,000 mPa·s at 160° C., and a melting point from 70° C. to 120° C.

16. The PUR powder paint of claim 15, wherein said OH functionality is from 3 to 4.2, said average molecular weight is from 2,300 to 4,500, said OH number is from 30 to 90 mg KOH/g, said viscosity is less than 50,000 mPa·s, and said melting point is from 75° C. to 100° C.

17. The PUR powder paint of claim 16, wherein said OH functionality is from 3.5 to 3.9, said average molecular weight is from 2,800 to 3,500, said OH number is from 35 to 85 mg KOH/g, and said viscosity is less than 40,000 mPa·s.

18. The PUR powder paint of claim 1, wherein said ratio of said hydroxyl groups to the total NCO groups of said polyisocyanate-urea adduct is from about 1.0:0.6 to about 1.0:1.2.

19. The PUR powder paint of claim 18, wherein the ratio of said hydroxyl groups to the total NCO groups of said polyisocyanate-urea adduct is from about 1,0:0,8 to about 1,0:1,1.

20. The PUR powder paint of claim 18, wherein said ratio is about 1:1.

21. The PUR powder paint of claim 1, further comprising:
   (iii) pigments or fillers in an amount up to 45 weight % based on the total weight of said paint.

22. The PUR powder paint of claim 1, further comprising:
   (iv) an isocyanate polyaddition catalyst in an amount of from 0.01 to 1.5 weight % based on the total weight of said paint.

23. The PUR powder paint of claim 22, wherein said catalyst is present in an amount of from 0.1 to 0.5 weight % based on the total weight of said paint.

* * * * *